(12) United States Patent
Arnal et al.

(10) Patent No.: US 8,318,278 B2
(45) Date of Patent: Nov. 27, 2012

(54) ADHESIVE ATTACHMENT AND METHOD (75) Inventors: David B. Arnal, Mt. Laurel, NJ (US);
Timothy T. Broderick, Voorhees, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 984 days.

(21) Appl. No.: 11/944,054

(22) Filed: Nov. 21, 2007

(65) Prior Publication Data
US 2009/0130361 A1 May 21, 2009

(51) Int. Cl.
*B32B 7/06* (2006.01)
*B29C 65/48* (2006.01)
*B32B 7/14* (2006.01)
*C09J 5/00* (2006.01)
*C09J 163/00* (2006.01)

(52) U.S. Cl. ........ 428/40.1; 428/41.7; 428/68; 428/156; 428/166; 428/172; 156/247; 156/295; 156/314; 156/330

(58) Field of Classification Search .................. None
See application file for complete search history.

(56) References Cited

U.S. PATENT DOCUMENTS

| | | | | | |
|---|---|---|---|---|---|
| 3,866,873 | A | * | 2/1975 | Bohli | 248/544 |
| 4,396,447 | A | * | 8/1983 | Firth | 156/201 |
| 4,793,886 | A | * | 12/1988 | Okamura et al. | 156/307.3 |
| 4,822,224 | A | * | 4/1989 | Carl et al. | 411/82.5 |
| 4,842,912 | A | * | 6/1989 | Hutter, III | 428/66.6 |
| 5,333,737 | A | * | 8/1994 | Clark | 206/568 |
| 7,815,988 | B2 | * | 10/2010 | Stumpf et al. | 428/40.1 |
| 2005/0280032 | A1 | * | 12/2005 | Hutter, III | 257/202 |
| 2009/0022976 | A1 | * | 1/2009 | Enserink et al. | 428/321.1 |
| 2011/0042002 | A1 | * | 2/2011 | Blank et al. | 156/307.1 |

FOREIGN PATENT DOCUMENTS

| | | | | |
|---|---|---|---|---|
| EP | 200296 | A2 | * | 11/1986 |
| GB | 1385276 | A | * | 2/1975 |
| JP | 10120040 | A | * | 5/1998 |
| WO | WO 9509548 | A1 | * | 4/1995 |
| WO | WO 2005093270 | A1 | * | 10/2005 |
| WO | WO 2006064312 | A1 | * | 6/2006 |
| WO | WO 2007021170 | A1 | * | 2/2007 |

OTHER PUBLICATIONS

Machine Translation of JP 10-120040 A, May 1998.*
http://www.kslsecurity.com/security/cable-mounts/.
http://cableorganizer.com/adhesive-base/.

* cited by examiner

*Primary Examiner* — David Sample
*Assistant Examiner* — Jeff Vonch
(74) *Attorney, Agent, or Firm* — Howard IP Law Group, PC (57) ABSTRACT

An easy to use epoxy-mount base plate assembly has components of a two-part epoxy adhesive pre-dispensed on the assembly's base plate in a plurality of alternating segments and prepackaged with a protective adhesive cover that keeps each epoxy component segment separated from one another until ready for use. To attach the base plate of the assembly to a surface, the adhesive cover is removed exposing the epoxy segments. The base plate is then pressed against a mounting surface and twisted thus mixing the epoxy components and initiating a curing process for the epoxy.

11 Claims, 11 Drawing Sheets

ADHESIVE ATTACHMENT AND METHOD

GOVERNMENTAL INTEREST

This invention was made with government support under Contract/Grant Aegis/SM-6 Integration N00024-04-C-5128. The United States Government has a non-exclusive, non-transferable, paid-up license in this invention.

CROSS-REFERENCE TO RELATED APPLICATION

None

FIELD OF THE INVENTION

The present invention relates to the field of adhesive attachment assemblies and related method of use for securing an adhesive attachment onto a surface.

BACKGROUND

In many industrial applications, it is necessary or desirable to mount or attach an element such as a cable clamp, a threaded screw stud, or the like onto a supporting substrate by means of an adhesive connection or a bond. For example, it may be necessary to attach a cable clamp, a threaded screw stud, or the like to the hull or other surfaces of a ship. In a typical ship environment where the hull or other surfaces of a ship steel, such elements are attached by welding.

Welding, however, poses many inconveniences and is not the most desired method in a shipyard environment because a welder and electric power for operating the welder must be brought to the work location that can be cramped and located at the very remote corners of the ship. In addition, the heat generated from the welding procedure poses a fire hazard. For example if a cable clamp is being welded to the bulkhead of the ship, the fire hazard exists on both sides of the bulkhead. If lagging has been installed on the opposite side of the bulkhead, it must be removed before the cable clamp can be welded to the bulkhead. The area where the paint is burned will have to be cleaned and repainted after the welding is complete.

Thus, an improved attachment assembly and method is desired.

SUMMARY OF THE INVENTION

According to an embodiment of the invention, an epoxy-mount base plate assembly is disclosed. The epoxy-mount base plate assembly comprises a base plate having a mounting face. Components of a two-part epoxy adhesive are predispensed on the mounting face in a plurality of discrete segments, wherein said two-part epoxy adhesive components alternate among the plurality of discrete segments. An adhesive cover configured to cover and keep the epoxy adhesive segments apart from one another while attached to the mounting face of the base plate is removably attached to the mounting face. The adhesive cover prevents premature mixing of the epoxy components before the cover is removed. Such epoxy-mounted base plate can be used to repair a hole in a surface such as an aircraft fuselage or a ship's hull, for example.

According to another embodiment, an epoxy-mount base plate assembly comprises a base plate having a mounting face. Components of a two-part epoxy adhesive are predispensed on the mounting face in a plurality of discrete segments, wherein said two-part epoxy adhesive components alternate among the plurality of discrete segments. An adhesive cover is removably attached to the mounting face of the base, covering the epoxy adhesive segments and keeping the adhesive segments apart from one another to prevent premature mixing before the cover is removed.

According to other embodiments, the base plate comprises a structure provided on its top side that may be a utility object or an ornamental object such that the base plate assembly functions as an attachment means to attach the structure to a desired surface.

According to another embodiment of the invention, a method of assembling an epoxy-mount base plate assembly is disclosed. A base plate having a mounting face for attaching to a mounting surface is provided. Then, a plurality of alternating segments of a two-part epoxy adhesive components are dispensed on to the mounting face. Next, an adhesive cover is removably attached to the mounting face, wherein the adhesive cover is configured to keep the dispensed alternating segments of the two-part epoxy adhesive components separated while the adhesive cover is attached to the mounting face.

According to another embodiment of the invention, a method of attaching the epoxy-mount base plate described herein to a mounting surface is disclosed. To attach the base plate to a surface, the adhesive cover is removed exposing the plurality of segments of the two-part epoxy adhesive components predispensed on the mounting face of the base plate. The user then presses the mounting face of the base plate against the mounting surface and twists the assembly, thereby mixing the two-part components of the epoxy adhesive between the two mating surfaces and initiating the epoxy curing process. Next, the base plate has to be appropriately held in place while the epoxy cures. If the mounting surface is horizontal, the epoxy-mount base can be left alone and the gravity will hold it in place. If the mounting surface is not horizontal, then the epoxy-mount base can be temporarily secured in place via some appropriate external fixturing, such as clamps, clips, magnets, etc.

The epoxy-mount base plate assembly described herein can simplify the task of attaching such utility objects as cable clamps or threaded screw studs to a ship's hull, for example, and make is safer. Because the utility objects are attached by an adhesive, welding equipment is not required and the associated fire risks are eliminated.

BRIEF DESCRIPTION OF THE DRAWINGS

These and other features and advantages of the present invention will be more fully disclosed in the following detailed description of the preferred embodiment of the invention, which is to be considered together with the accompanying drawings wherein like numbers refer to like parts, and further wherein.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

Figure 1A:
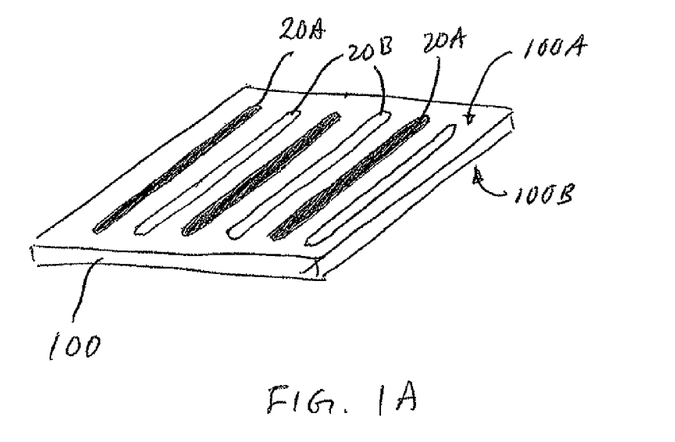
FIG. 1A is an illustration of an epoxy-mount base plate according to an embodiment.
Figure 1B:
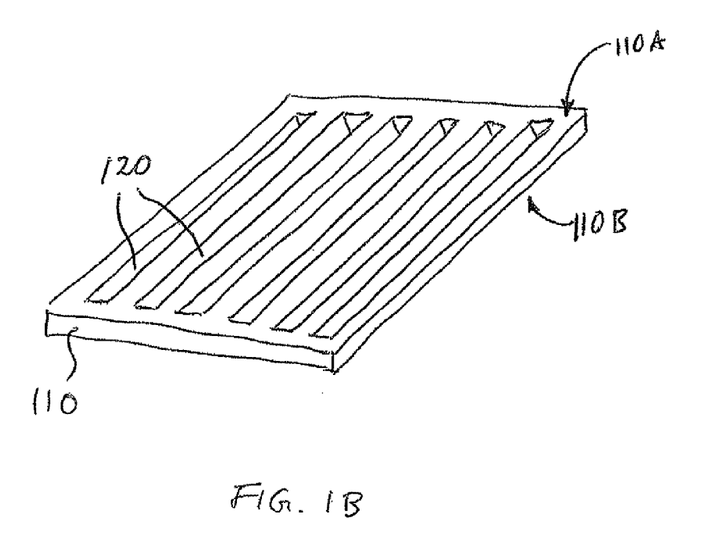
FIG. 1B is an illustration of an adhesive cover for the base plate of FIG. 1A.

FIGS. 1A and 1B show an epoxy-mount base plate assembly according to an embodiment of the invention. The assembly includes an epoxy-mount base plate 100 that is a substantially flat piece that has two major surfaces, a mounting face 100A and the top side 100B. On the mounting face 110A, components of a two-part epoxy adhesive 20A and 20B are predispensed thereon. The epoxy adhesive components 20A, 20B are predispensed in a plurality of discrete segments or portions and the two-part epoxy adhesive components alternate among the plurality of the discrete segments. The alternate arrangement helps uniform mixing of the epoxy adhesive components later on.

To keep the components of the epoxy adhesive separated, the assembly includes an adhesive cover 110 that is removably attached to the mounting face 100A of the base plate 100. The adhesive cover 110 is removably attached to the mounting face 100A by an appropriate adhesive such as a pressure sensitive acrylic adhesive or film to hold it in place until the assembly is ready to be used. The adhesive cover 110 is provided with a plurality of slots 120 on mating face 110A that are positioned to align with the plurality of discrete segments of the epoxy adhesive components 20A, 20B on the mounting face 100A of the base plate 100. Because the mating face 110A of the cover 110 is sealably attached to the mounting face 100A of the base plate, each slot or compartment 120 encases each of the epoxy adhesive component segments 20A and 20B and prevent them from mixing with one another until the cover 110 is removed. The slots 120 are not holes but cavities that are open only on the mating face 110A of the cover and do not go through to the top side 110B of the cover 110.

Figure 1C:
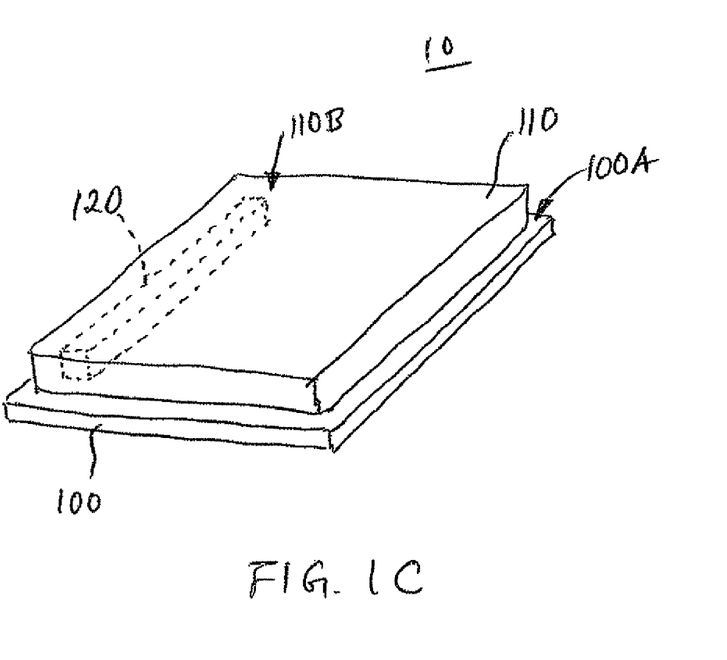
FIG. 1C is an illustration of an epoxy-mount base plate assembly according to an embodiment.

FIG. 1C shows a fully assembled epoxy-mount base plate assembly 10. The adhesive cover 110 is removably attached to the mounting face 100A of the base plate 100. The plurality of slots 120 (shown in phantom lines) keep the plurality of epoxy component segments 20A, 20B separated. To attach the base plate 100 to a surface, the adhesive cover 110 is removed by peeling off the base plate 100 and the mounting face 100A with the epoxy components thereon is pressed onto a surface and twisted. The twisting motion mixes the epoxy adhesive components initiating the curing process for the epoxy adhesive. Such epoxy-mount base plate 100 can be used for covering up or repairing a hole in a surface such as an aircraft fuselage or a ship's hull, for example.

Because the epoxy components need to be mixed, preferably uniformly, in order to cure the epoxy adhesive, the arrangement of the dispensed segments of the epoxy adhesive components 20A and 20B, although can be in any arrangement or pattern, preferably should be some configuration that would enable uniform mixing of the epoxy components 20A, 20B by the twisting motion.

Figure 2:
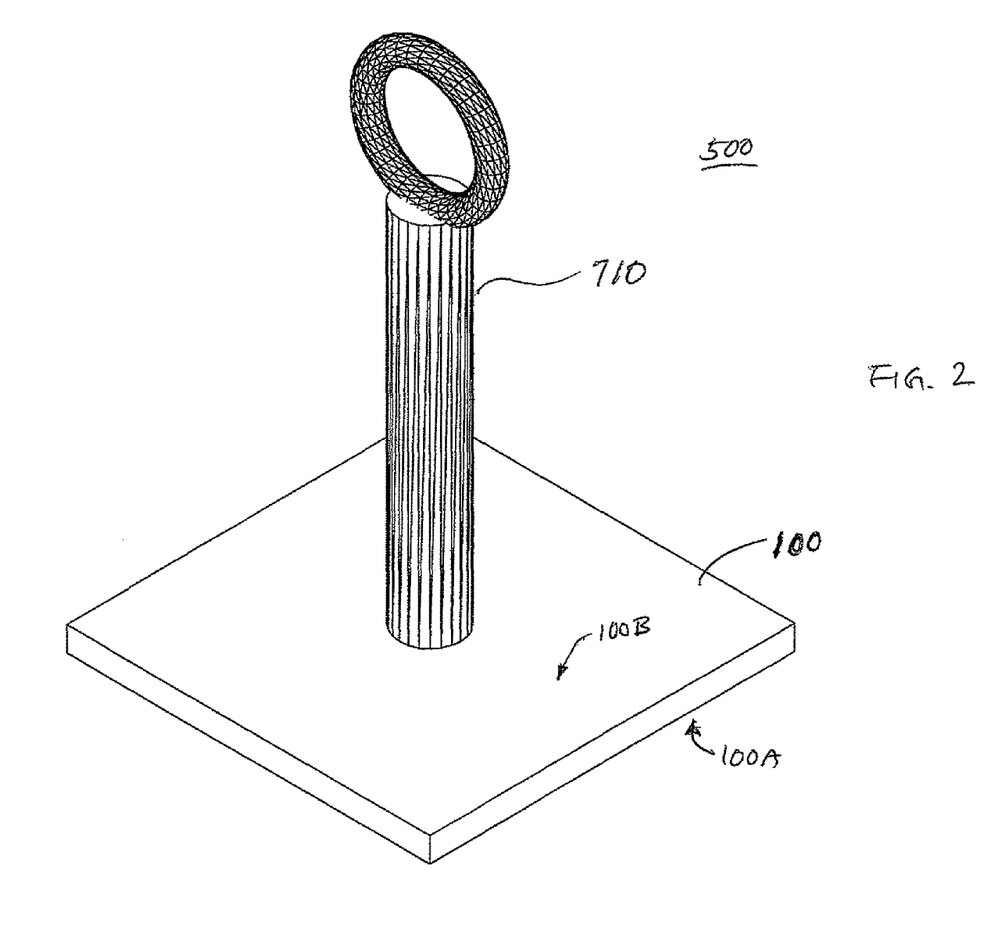
FIGS. 2, 3A-3C and 4 are illustrations of various exemplary embodiments of an epoxy-mount base plate assembly.

FIG. 2 shows an epoxy-mount base plate assembly 500 according to another embodiment. The assembly 500 comprises an epoxy-mount base plate 100 and adhesive cover 110 described in connection with FIGS. 1A-1C and also includes a structure 710 attached to the topside 100B of the base plate 100. The structure 710 can be a utility object or an ornamental object that one desires to attach to a surface using the base plate 100. In this example, the structure 710 is a utility object and happens to be a cable clamp that can be used on a ship. This cable clamp assembly 500 can be attached to a surface on a ship, such as a bulkhead, following the attachment method described above. One would remove the adhesive cover 110 from the mounting face 100A exposing the epoxy adhesive component segments 20A, 20B. The installer would then press the base plate's mounting face 100A against a surface and twist the cable clamp mixing the epoxy components. In a shipyard application such as this example, where the mounting surface of the ship is most likely ferrous metal, the cable clamp assembly 500 can be temporarily held in place using a high strength magnet placed over the base plate 100.

The base plate 100 of the epoxy-mount base plate assembly is not limited to the substantially square shape illustrated in the examples of FIGS. 1A-2. The base plate can be provided in any desired shape as long as the mounting face 100A is substantially contoured to contact the mounting surface with sufficient intimacy for optimal performance of the particular epoxy adhesive being used. For example, the base plate 100 is not limited to being a thin plate-like shape but can be a cube or other shape having a substantial 3-dimensional volume with a mounting face appropriately contoured to mate with the surface on which the base plate is to be mounted. For instance, if the mounting surface is substantially flat, the mounting face 100A of the base plate 100 is also preferably substantially flat. If the mounting surface has a spherical contour, the mounting face 100A should also have the matching spherical contour. However, because the base plate has to be twisted to mix the epoxy components, the mounting surface and the corresponding mounting surface can not have irregular contour. The two mating surfaces are preferably axially symmetrical whether they are flat or contoured.

Figure 3A:
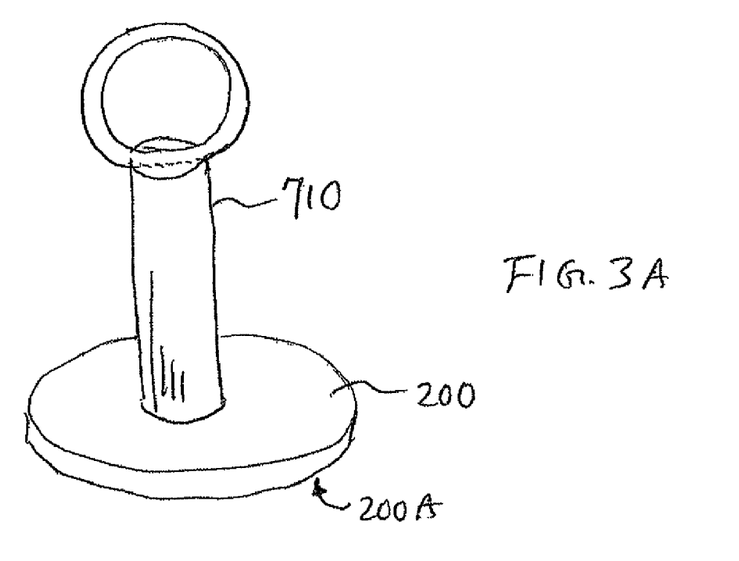
Figure 3B:
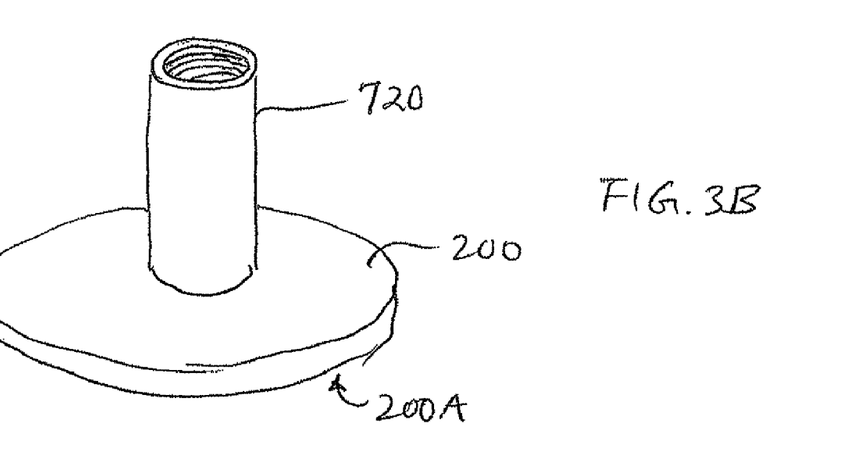
Figure 3C:
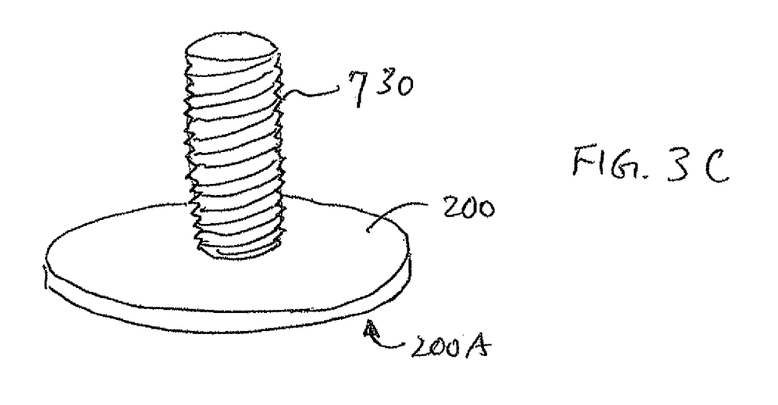
Figure 4:
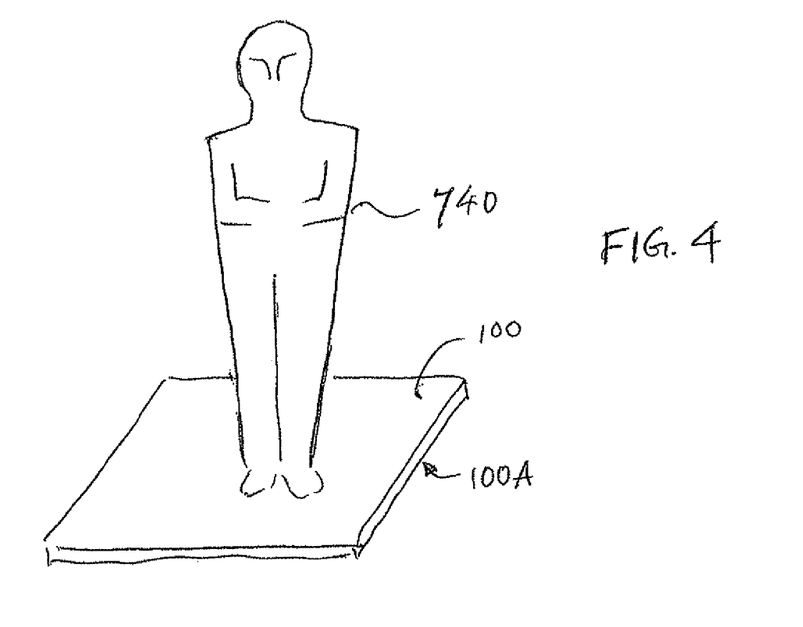

FIG. 3A shows an embodiment wherein the cable clamp structure 710 has a base plate 200 that has a circular shape and having a mounting face 200A. The structure 710 can be any other utility object. For example, FIG. 3B shows another embodiment wherein the circular shaped base plate 200 is attached to a structure 720 that is a threaded bushing, FIG. 3C shows yet another embodiment wherein a threaded screw stud 730 is attached to a circular base plate 200. According to another embodiment, the structure attached to the base plate can be an ornamental object as shown in FIG. 4. Shown in FIG. 4 is a epoxy-mount base plate assembly wherein a human figurine 740 is attached to a square shaped base plate 100.

Figure 5A:
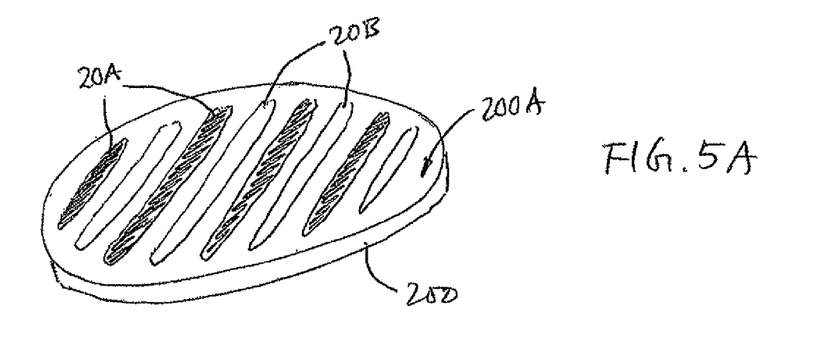
FIGS. 5A, 5B, 6A, 6B, 7A, 7B, 8A and 8B are illustrations of epoxy-mount base plates according to various other embodiments and their corresponding adhesive covers.
Figure 5B:
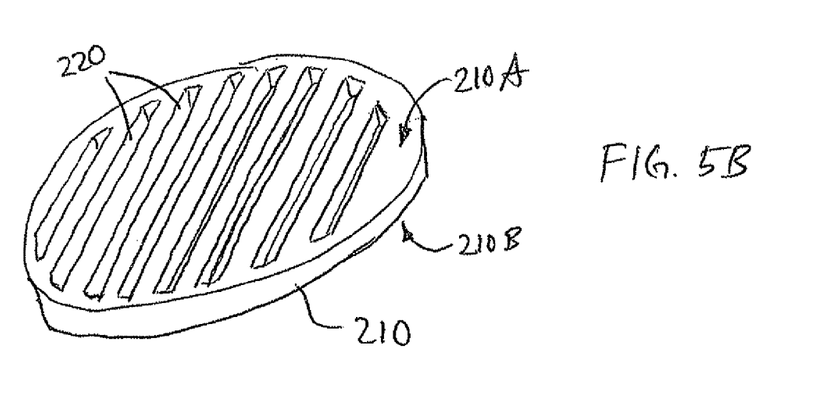

FIG. 5A shows an example of a circular shaped base plate 200 with a plurality of segments of two-part epoxy components predispensed on the mounting face 200A. FIG. 5B shows an example of the corresponding adhesive cover 210. The adhesive cover 210 is provided with a plurality of cavities or slots 220 that are shaped and positioned to correspond and align with the plurality of epoxy component segments 20A, 20B on the base plate 200. The mating surface 210A of the adhesive cover can be treated with an appropriate adhesive such as a pressure sensitive adhesive film to enable the adhesive cover 210 to removably attach to the mounting surface 200A of the base plate.

According to an aspect of the invention, the two-part epoxy components can be predispensed in any pattern or array of segments that would allow substantially uniform mixing of the two epoxy components 20A, 20B when the base plate is twisted against a mounting surface. The term "segment" as used herein in reference to the epoxy components refers to any shape that the epoxy components may be predispensed and is not limited to continuous elongated shapes of the examples shown in FIGS. 1A and 5A. Similarly, the term "slot" as used herein in reference to the cavities provided on the mating face of the adhesive covers refers to any shape that corresponds to the shape of the epoxy segments each slot is intended to encase.

Figure 6A:
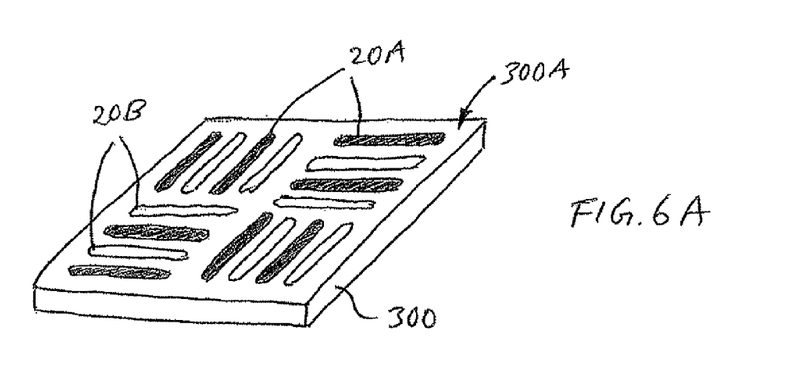
Figure 6B:
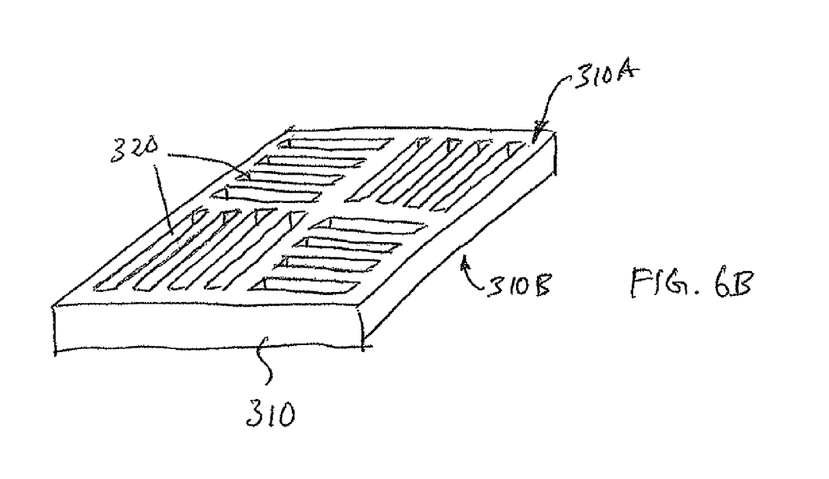

For example, FIG. 6A shows an embodiment of a base plate 300 wherein the epoxy components 20A, 20B are predispensed in short segments patterned in small groups. The epoxy component segments can even be predispensed in random shapes and patterns as long as they provide uniform mixing of the epoxy components. FIG. 6B shows the adhesive cover 310 corresponding to the base plate 300 of FIG. 6A. the adhesive cover 310 is provided with a plurality of slots 320 that correspond to the number and pattern of the epoxy component segments on the base plate 300.

Figure 7A:
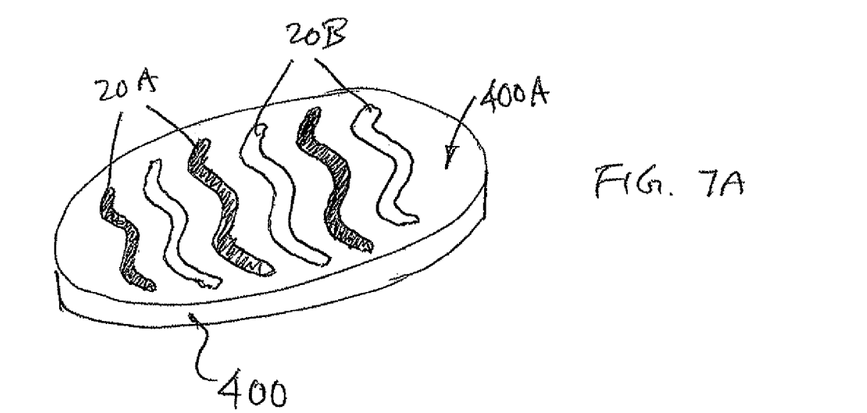
Figure 7B:
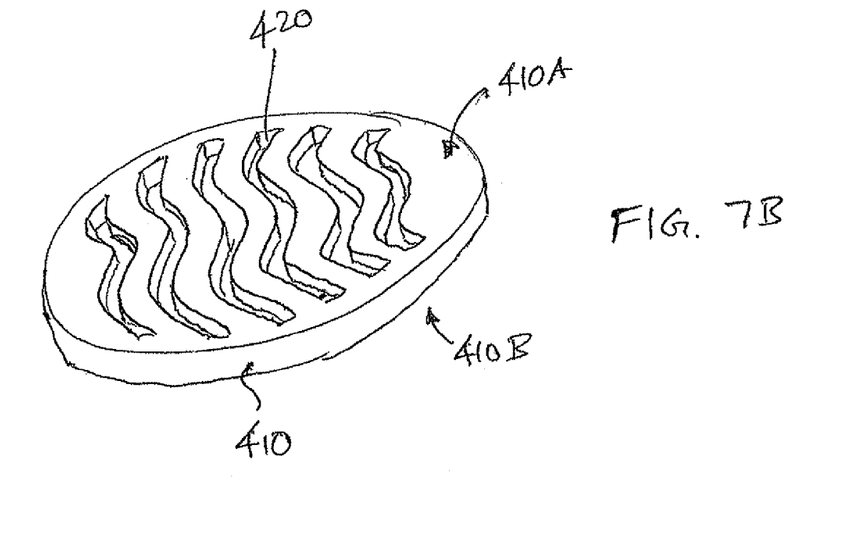

FIG. 7A shows yet another embodiment of a base plate 400 having a plurality of two-part epoxy component segments 20A, 20B provided on the mounting face 400A. The epoxy segments are predispensed in an alternating array of wave-like forms. FIG. 7B shows the corresponding adhesive cover 410 provided with a plurality of slots 420 on the mating face 410A.

Figure 8A:
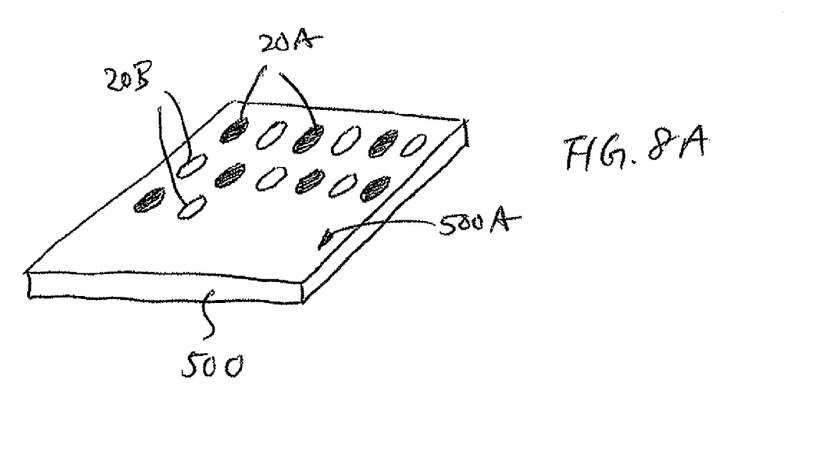
Figure 8B:
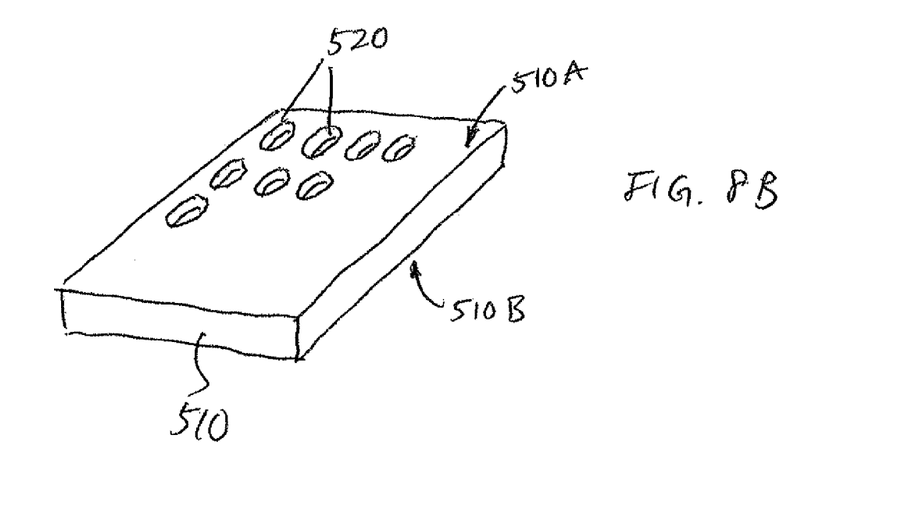

FIG. 8a shows another embodiment of a base plate 500 having a plurality of two-part epoxy component segments 20A, 20B provided on the mounting face 500A. The segments of the epoxy components are predispensed in an alternating array of droplets or oval shapes. FIG. 8B shows the corresponding adhesive cover 510 provided with a plurality of slots 520 on the mating face 510A. The slots 520 have droplet or oval shapes corresponding to the epoxy component segments on the base plate 500.

In the examples described above, the two-part epoxy components were predispensed on to the mounting face of a base plate and subsequently covered by the corresponding adhesive cover. Alternatively, the epoxy components can be predispensed into each of the slots provided on the adhesive covers and then attach the adhesive covers to the mounting face of the base plate. This embodiment provides simpler assembly process during manufacture of the epoxy-mount base plate assembly because the adhesive cover does not need to be aligned with the epoxy adhesive segments when attaching it to the base plate.

Figure 9:
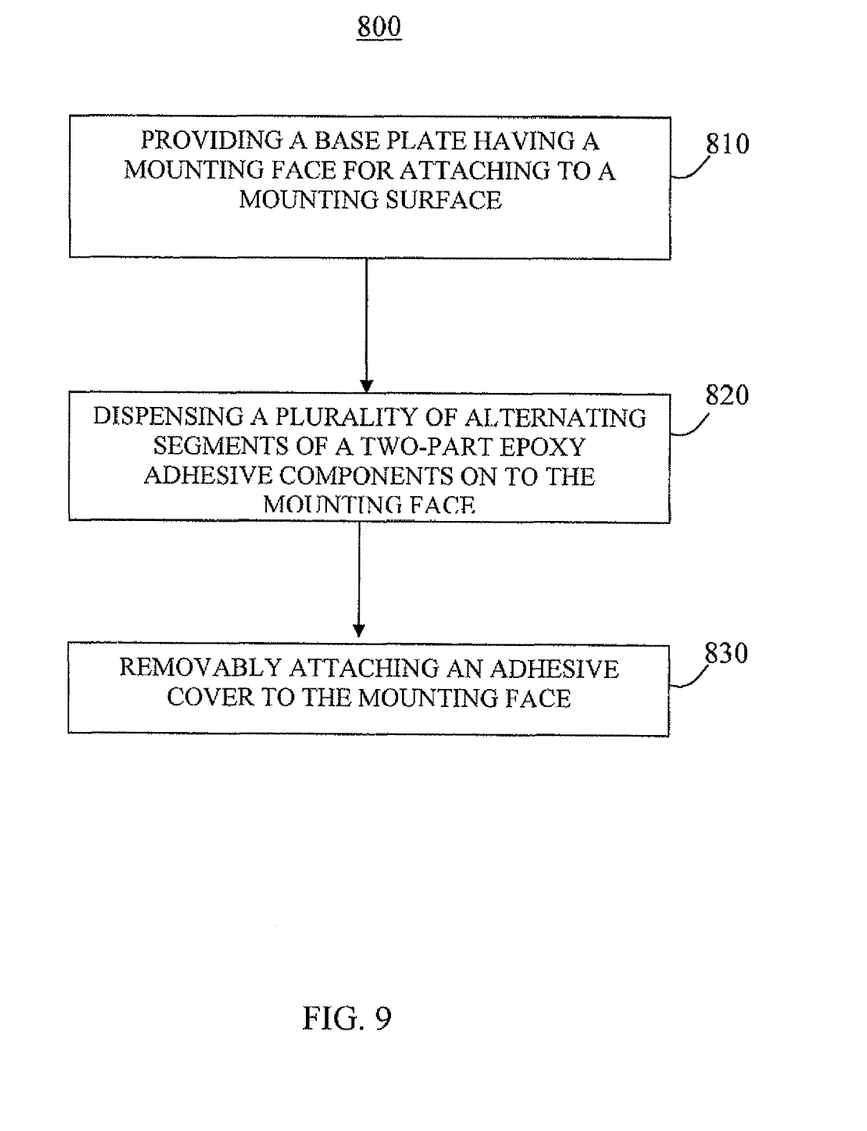
FIG. 9 is a flowchart diagram of a method according to an aspect of the invention.

Referring to FIG. 9, a method of assembling an epoxy-mount base plate assembly according to another embodiment of the invention is disclosed. A base plate having a mounting face for attaching to a mounting surface is provided (see box 810 of FIG. 9) and then a plurality of alternating segments of a two-part epoxy adhesive components are dispensed on to the mounting face (see box 820). Next, an adhesive cover is removably attached to the mounting face wherein the adhesive cover is configured to keep the dispensed alternating segments of the two-part epoxy adhesive components separated while the adhesive cover is attached to the mounting face (see box 830). The adhesive cover is configured as described above and can be attached to the mounting face with appropriate adhesive material such as a pressure sensitive adhesive.

Figure 10:
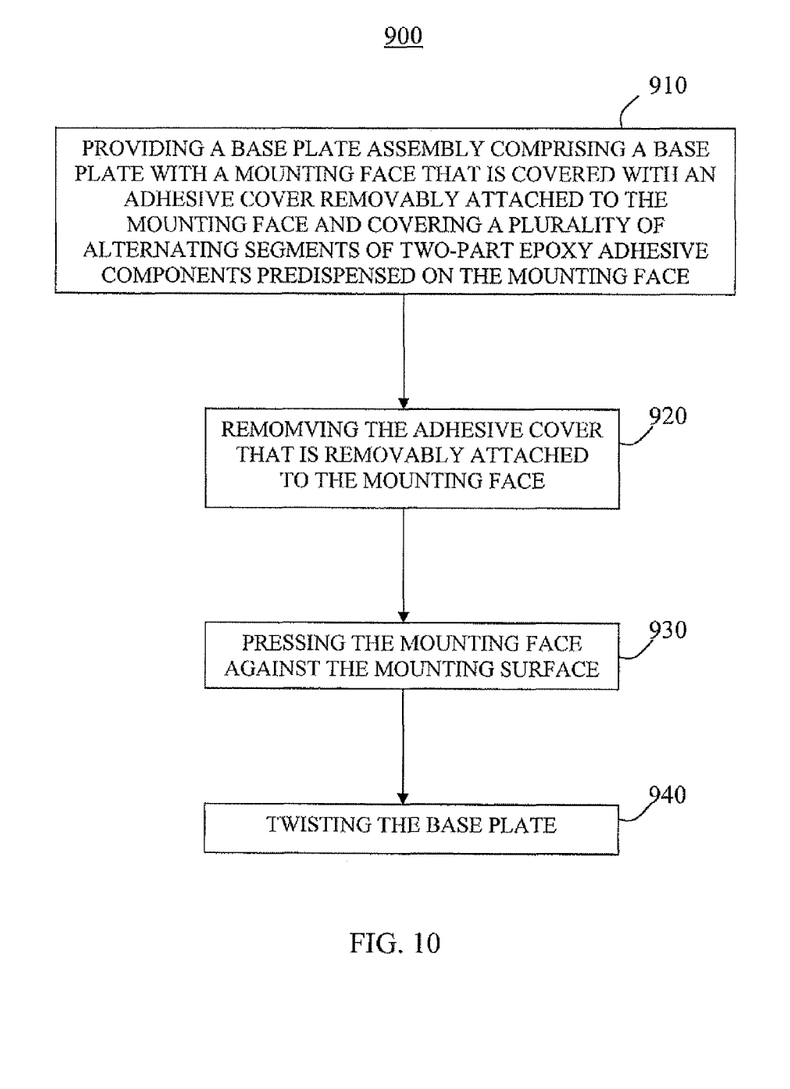
FIG. 10 is a flowchart diagram of another method according to another aspect of the invention.

Referring to FIG. 10, a method of attaching the epoxy-mount base plate described above to a mounting surface according to yet another embodiment of the invention is disclosed. First, a base plate assembly comprising a base plate having a mounting face that is covered with an adhesive cover removably attached to the mounting face and covering a plurality of alternating segments of two-part epoxy adhesive components predispensed on the mounting surface is provided. To attach the base plate to a mounting surface the adhesive cover is removed exposing the plurality of segments of the two-part epoxy adhesive components predispensed on the mounting face of the base plate (see box 920). The user then presses the mounting face of the base plate against the mounting surface (see box 930) and twists the assembly, thereby mixing the two-part components of the epoxy adhesive between the two mating surfaces and initiating the epoxy curing process (see box 940). Next, the base plate is appropriately held in place, if necessary, while the epoxy cures.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An epoxy-mount base plate assembly comprising:
   a base plate having a mounting face;
   components of a two-part epoxy adhesive predispensed on said mounting face in a plurality of discrete segments, wherein said two part epoxy adhesive components alternate amount the plurality of discrete segments; and
   an adhesive cover removably attached to the mounting face of the base plate for covering the epoxy adhesive segments, the adhesive cover comprising:
      a first and a second face, the cover being removably attached to the mounting face of the base plate by the first face; and
      a plurality of slots provided on the first face, each slot encasing a segment of the epoxy adhesive components for keeping the adhesive segments apart from one another to prevent premature mixing when the cover is attached to the base plate, each slot of a depth and extending toward said second face, wherein the distance between the first and second faces of the cover in the area between the adjacent slots exceeds the maximum slot depth; and
   wherein the base plate comprises a utility object provided on its top side.

2. The epoxy-mount base plate assembly of claim 1, wherein said utility object is a cable clamp.

3. The epoxy-mount base plate assembly of claim 1, wherein said utility object is a threaded screw stud.

4. The epoxy-mount base plate assembly of claim 1, wherein said utility object is a threaded bushing.

5. The epoxy-mount base plate assembly of claim 1, wherein said base plate comprises an ornamental object provided on its top side.

6. The epoxy-mount base plate assembly of claim 1, wherein the base plate has a substantially flat mounting face.

7. The epoxy-mount base plate assembly of claim 1, wherein the mounting face is contoured to match a surface to which the epoxy-mount base plate will be attached.

8. A method of assembling an epoxy-mount base plate comprising:

providing a base plate having a mounting face for attaching to a mounting surface and a top side wherein a utility object is provided;

dispensing a plurality of alternating, discrete segments of a two-part epoxy adhesive components on to the mounting face; and removably attaching an adhesive cover comprising a first face and a second face to the mounting face of the base plate by the first face, the first face being configured with a plurality of slots, each slot encasing a segment of the epoxy adhesive components for keeping the dispensed alternating segments separated to prevent premature mixing while the cover is attached to the mounting face of the base plate, each slot of a given depth and extending toward said second face, wherein the distance between the first and second faces of the cover in the area between the adjacent slots exceeds the maximum slot depth.

9. The method of claim 8, wherein the adhesive cover is attached to the mounting face by a pressure sensitive adhesive material.

10. The epoxy-mount base plate of claim 1, wherein the second face is planar.

11. The method of claim 8, wherein the second face is planar.

* * * * *

UNITED STATES PATENT AND TRADEMARK OFFICE
CERTIFICATE OF CORRECTION

PATENT NO. : 8,318,278 B2
APPLICATION NO. : 11/944054
DATED : November 27, 2012
INVENTOR(S) : David B. Arnal et al.

It is certified that error appears in the above-identified patent and that said Letters Patent is hereby corrected as shown below:

Column 6, claim 1, line 34, the second word should be "among".

Signed and Sealed this
Eighth Day of January, 2013

David J. Kappos
*Director of the United States Patent and Trademark Office*